United States Patent
Grunder et al.

(10) Patent No.: US 10,450,486 B2
(45) Date of Patent: Oct. 22, 2019

(54) DUAL CURE 1K PU ADHESIVE FORMULATIONS USING MATRIX ENCAPSULATED POLYAMINES

(71) Applicant: Dow Global Technologies LLC, Midland, MI (US)

(72) Inventors: Sergio Grunder, Zurich (CH); Daniel Schneider, Waedenswil (CH); Stefan Schmatloch, Thalwil (CH); Andreas Lutz, Galgenen (CH)

(73) Assignee: Dow Global Technologies LLC, Midland, MI (US)

( * ) Notice: Subject to any disclaimer, the term of this patent is extended or adjusted under 35 U.S.C. 154(b) by 349 days.

(21) Appl. No.: 15/324,360

(22) PCT Filed: Jul. 29, 2015

(86) PCT No.: PCT/US2015/042577
§ 371 (c)(1),
(2) Date: Jan. 6, 2017

(87) PCT Pub. No.: WO2016/022346
PCT Pub. Date: Feb. 11, 2016

(65) Prior Publication Data
US 2017/0204300 A1    Jul. 20, 2017

Related U.S. Application Data

(60) Provisional application No. 62/033,260, filed on Aug. 5, 2014.

(51) Int. Cl.
| | |
|---|---|
| C08J 11/00 | (2006.01) |
| C09J 11/06 | (2006.01) |
| C09J 175/04 | (2006.01) |
| C09J 11/08 | (2006.01) |
| C08K 5/17 | (2006.01) |

(52) U.S. Cl.
CPC .............. *C09J 11/06* (2013.01); *C09J 11/08* (2013.01); *C09J 175/04* (2013.01); *C08K 5/17* (2013.01)

(58) Field of Classification Search
CPC . C09J 11/06; C09J 11/08; C09J 175/04; C09J 11/00; C08J 3/241; C08K 9/10
USPC .......................................................... 523/211
See application file for complete search history.

(56) References Cited

U.S. PATENT DOCUMENTS

| | | | | |
|---|---|---|---|---|
| 4,940,852 A | * | 7/1990 | Chernack | C08G 59/188 523/211 |
| 9,000,120 B2 | * | 4/2015 | Ming | C08L 61/06 528/162 |
| 9,951,256 B2 | * | 4/2018 | Ming | C08L 61/06 |
| 2011/0245369 A1 | * | 10/2011 | Lundgard | C09D 17/008 523/122 |
| 2014/0107313 A1 | * | 4/2014 | Burckhardt | C07C 211/27 528/87 |
| 2018/0334596 A1 | * | 11/2018 | Lutz | A61N 1/0551 |

* cited by examiner

*Primary Examiner* — Hannah J Pak
(74) *Attorney, Agent, or Firm* — M. Robert Christy

(57) ABSTRACT

A new polyurethane (PU) adhesive composition with encapsulated hardeners having unique properties in automotive related applications.

4 Claims, No Drawings

DUAL CURE 1K PU ADHESIVE FORMULATIONS USING MATRIX ENCAPSULATED POLYAMINES

FIELD OF THE INVENTION

The present invention relates to a new polyurethane (PU) adhesive composition having unique properties in automotive related applications.

INTRODUCTION

Manufacturing of vehicles involves several applications of elastic and structural adhesive compositions to bond parts, body structures, and building blocks to enhance the performance of the vehicles. Many vehicle parts are routinely bonded outside the body shop in the trim shop using mainly two component (2K) polyurethane (PU) adhesives. One component (1K) PU adhesives have been well established in the automotive industry and are commonly cured by moisture. The 1K PU adhesives comprise PU prepolymers having free terminal isocyanate (NCO) groups. After the adhesive has been applied to the parts, the NCO groups react with moisture, i.e., water molecules when the parts were placed in ambient conditions. This process forms carbon dioxide and an amine from which the latter reacts again with available NCO groups causing crosslinking and hence curing the polymer. The parts are commonly fully cured after 7 days at ambient conditions. Other 1K PU adhesive developments involve encapsulated NCOs and such adhesives can be cured by heat. Heat curing accelerates the curing but the adhesive composition will not, however, be able to cure with humidity and the whole assembly of parts needs to be heated.

For ease of manufacturing and for other purposes, there is a need for a 1K PU adhesive which is capable of being cured by both cure mechanisms—heat and moisture. The dual cure 1K PU formulation can be applied to parts and then be cured by heat (i.e., induction, infrared, hot air, etc.). This can involve pre-curing, or spot curing at critical positions enough to give the bonded parts structural stability. In a second step, the applied adhesive composition will be able to further cure by moisture. This adds a large value in performance of the adhesive and facilitates the assembly of various vehicle parts. Advantages of a dual cure 1K formulation include lower investment costs for application equipment and increased application process stability. The dual cure 1K adhesive composition can potentially substitute currently applied 2K PU adhesives.

Attempts have been made to come up with such dual cure 1K adhesives. In one study, solid polyamines were dispersed into a 1K PU formulation bearing NCO prepolymers. The outcome of such a study seems to indicate the lack of e-coat substrate stability after humidity exposure (i.e., cataplasma). Furthermore, there is a significant undesired viscosity increase even when the composition is kept at room temperature indicating poor storage stability.

SUMMARY OF THE INVENTION

In the present invention, solid latent amine hardeners, such as 1,12-dodecane-diamine, are provided in the adhesive compositions via matrix encapsulation in a thermoplastic polymer. For example, semicrystalline C10-C30 alkyl brushed acrylic copolymer as well as low melting low density polyethylene can be used as a suitable thermoplastic matrix. The matrix polymers have a distinct melting point allowing the encapsulated amine to be liberated when the matrix phase is switched from crystalline or semicrystalline to an amorphous state. Adhesive compositions with the encapsulated amines show, surprisingly, a dual cure mechanism, improved storage stability, and superior substrate stability after humidity exposure.

DETAILED DESCRIPTION OF THE INVENTION

The present invention provides a 1K PU adhesive composition having encapsulated hardeners in a typical base adhesive composition with some NCO prepolymers.

The base adhesive composition typically comprises 30 to 60 wt %, based on the total weight of the adhesive composition, of isocyanate functional prepolymer made from a polyol and a polyisocyanate. The polyol can be selected from polypropyleneoxide, polyethyleneoxide, polyester polyols, polycaprolactone, polybutyleneoxides, polycaprolactone, polybutadiene, polytetrahydrofurane, or mixtures thereof. The adhesive composition may further comprise up to 40 wt %, based on the total weight of the adhesive composition, of plasticizers such diisononylphtalate. The adhesive composition may further comprise polyisocyanates, catalysts such as metal catalysts, e.g., tin, bismuth, zinc based catalysts, amine catalysts, fillers such as carbon black, white pigments, calcinated clay, talc, silica (fumed silica), zeolithes (molecular sieves), calcium oxide, and calcium carbonate.

One example of commercially available base adhesive composition includes Betaseal™ series available from The Dow Chemical Company: e.g., Betaseal™ 1757, Betaseal™ 1759, and Betaseal™ 1773. The NCO prepolymers contained in the base adhesive composition has a NCO content of about 0.8 to 2%, preferably around 1.2%.

Many different polymers may be used to encapsulate hardeners in the present invention. These include polyolefins, polyacrylates, polyesters, polyamides or mixture thereof. In a preferred embodiment, an aliphatic acrylate copolymer and a polyolefin are separately used as matrix encapsulating materials. In one embodiment of the present invention, an alkyl C10-30 brushed acrylic polymer (commercially available as Intelimer™ IPA 13-6 from Air Products) is used as an encapsulating matrix polymer. In another embodiment of the present invention, 1-octene ethylene copolymer, a low density polyethylene available as Affinity™ GA 1950 from The Dow Chemical Company, is used as a matrix encapsulating polymer material. The matrix encapsulating materials may also be a mixture of the above different kinds of matrix or further comprise small amounts of wax or other similar materials.

Most latent solid hardeners may be used and encapsulated using the present invention. Preferred hardeners are amines with a melting point between 60 and 150° C. These include: 4,4'-diaminodiphenylmethane, 2,4'-diaminodiphenylmethane, 3,3'-diaminodiphenylmethane,3,4'-diaminodiphenylmethane, 2,2'-diaminobiphenyl, 2,4'-diaminobiphenyl, 3,3'-diaminobiphenyl, 2,4-diaminophenol, 2,5-diaminophenol, o-phenylenediamine, m-phenylenediamine, 2,3-tolylenediamine, 2,4-tolylenediamine, 2,5-tolylenediamine, 2,6-tolylenediamine, 3,4-tolylenediamine and aliphatic amines such as 1,12-dodecanediamine (1,12-diaminododecane) (DDA), 1,14-tetradecanediamine, 1,16-hexadecanediamine, 1,18-octadecanediamine and 1,20-eicosanediamine. In a preferred embodiment, the hardener comprises DDA In a preferred embodiment, one kind of amine is used as the hardener and one polymer is used as the matrix. The amine:matrix ratio is about 1:2 by weight. The encapsulated hardener is used such that stoichiometric amounts of amine are about the same as the isocyanate, i.e., 1 mol NH per 1 mol NCO. This means, when the adhesive composition has a higher percentage weight of NCO, more hardener will be needed.

In a process of preparing a preferred embodiment of the present invention, DDA is matrix encapsulated in an aliphatic acrylate copolymer or in a polyolefin and then added to an adhesive formulation with isocyanate functional prepolymers in order to provide a dual cure 1K PU adhesive. Upon heat activation, the matrix is triggered to release DDA which can subsequently react with the isocyanate functional prepolymer to crosslink the polymer. The matrix encapsulation provides good storage stability and superior substrate stability even when exposed to humidity.

EXAMPLES

The present invention can be further demonstrated with the following non-limiting examples.

Raw Material List and Sources

Table 1 describes the raw materials used in preparation of samples and their sources.

TABLE 1

Raw Materials

| Hardener: | Supplier | Chemistry |
|---|---|---|
| 1.12-Diamino-dodecane | Sigma Aldrich | 1.12-Diaminododecane |
| Wax/Polymer: | | |
| Carnauba wax No. 1 yellow refined | Sigma Aldrich | wax of the leaves of the palm *Copernicia prunifera*, mp. ~75° C.) |
| Intelimer IPA 13-6 | Air Products | Alkyl C10-30 brushed acrylic polymer |
| Affinity GA 1950 | The Dow Chemical Company | 1-octene ethylene copolymer. Low density polyethylene. |
| Prepolymer: | | |
| Prepolymer T-715 ADHESIVE | The Dow Chemical Company | MDI/PPO based |
| Betaseal ™ L1 | The Dow Chemical Company | Base 1K-PU adhesive |

MDI stands for methylene diphenyl diisocyanate.
PPO stands for polypropylene oxide.

Preparation of Samples

The preferred hardener, 1,12-diaminododecane (DDA), is first matrix encapsulated in an aliphatic acrylate copolymer as well as in a polyolefin and then added to a base adhesive formulation with isocyanate functional prepolymers in order to provide a dual cure 1K PU adhesive composition. Upon heat activation, the matrix polymer is triggered to release DDA which subsequently reacts with the isocyanate functional prepolymer to crosslink the polymer. The matrix encapsulation provides good storage stability and superior substrate stability even when exposed to humidity. In the following example of encapsulation of DDA, three examples were provided. In Inventive Example 1, the matrix polymer is Intelimer IPA 13-6. In Inventive Example 2, the matrix polymer is Affinity GA 1950. A Comparative Example 1 is also prepared with the encapsulating matrix being Carnauba wax. As a further comparison, an example of DDA without any encapsulating matrix was also provided as Comparative Example 2. These four examples of hardeners were added to a base adhesive composition (Betaseal L1) to provide four adhesive compositions—two inventive adhesive formulation examples, and two comparative adhesive formulation examples.

Betaseal L1 only has humidity cure mechanism and cannot be cured by heat. However, with the addition of the encapsulated amine hardener, the composition can be dual cured with heat and moisture.

Encapsulation 1A (for Inventive Example 1)

66.6 g of Intelimer IPA 13-6 (alkyl C10-30 brushed acrylic polymer, mp 65° C.), and 33.4 g 1,12-diaminododecane were mixed in a lab reactor. The mixture was heated to 90° C. under nitrogen, and mixed again for 15 min. The mixture crystallized at about 23° C. After the mixture crystallized, it was ground with a mortar.

Encapsulation 1B (for Inventive Example 2)

66.6 g Affinity GA 1950 (mp 65° C.) and 33.4 g 1,12-diaminododecane were mixed in a lab reactor. The mixture was then heated up to 90° C. under nitrogen, and mixed again for 15 min. The mixture crystallized at about 23° C. After the mixture crystallized, it was ground with a mortar.

Encapsulation 2 (for Comparative Example 1)

66.6 g Carnauba wax and 33.4 g 1,12-diaminododecane were mixed in a lab reactor. The mixture was heated to 90° C. under nitrogen, and was mixed again for 15 min. The mixture crystallized at about 23° C. After the mixture crystallized, it was ground with a mortar.

Inventive Example 1

A lab planetary mixer was charged with Betaseal L1 (334 g) and the encapsulated amine from Encapsulation 1A (16 g) and mixed for 15 minutes under vacuum at 15° C. The resulting product was then transferred into an aluminum cartridge.

Inventive Example 2

A lab planetary mixer was charged with Betaseal L1 (334 g) and the encapsulated amine from Encapsulation 1B (16 g) and mixed for 15 minutes under vacuum at 15° C. The resulting product was then transferred into an aluminum cartridge.

Comparative Example 1

A lab planetary mixer was charged with Betaseal L1 (334 g) and the encapsulated amine from Encapsulation 2 (16 g) and mixed for 15 minutes under vacuum at 15° C. The resulting product was then transferred into an aluminum cartridge.

Comparative Example 2

A lab planetary mixer was charged with Betaseal L1 (344 g) and 1,12-dodecanediamine (6.0 g) (without any encapsulation) and mixed for 15 minutes under vacuum at 15° C. The resulting product was then transferred into an aluminum cartridge.

Testing Methods and Performance Observations

The samples were subjected to some mechanical performance tests and the test results are provided below.

Differential Scanning Calorimetry (DSC):

The inventive and comparative examples were characterized by dynamic DSC (25 to 175° C., 20° C./min). In the heating scan of the DSC, an exothermic peak is observed for the reaction of the amine with the isocyanate. At temperature below the start of the reaction, a flat baseline is observed. The onset temperature is considered to be the onset of the exothermic peak. In the present experiment, the onset temperature of the exothermic reaction (onset temperature) was determined. It was observed that Inventive Example 1, Inventive Example 2, Comparative Example 1 and Comparative Example 2 can be triggered by heat to polymerize at 67° C., 68° C., 64° C., and 69° C., respectively.

Storage Stability:

The storage stability of the inventive and comparative examples was studied by monitoring the viscosity over a time period of three months. The viscosity was measured by Bohlin (CP20/4, 23° C., p/down, Casson).

It was observed that Inventive Example 1 and Comparative Example 2 do not show a viscosity increase over three months, indicating good storage stability. The viscosity of the Inventive Example 2 was stable over one month but did show a viscosity increase of 215% over three months. The Comparative Example 1, on the other hand, showed a viscosity increase of 280% over the time period of three months.

Mechanical Testing:

Lap shear strengths of the inventive and comparative examples were measured according to DIN EN 1465 on e-coated steel substrates, 10×25 mm bonding area, 2 mm bonding height.

Humidity cured samples are cured seven days at 23° C. with 50% relative humidity (r.h.). Cataplasma aging was performed by storing the cured samples seven days at 70° C. with 95% r.h., subsequently 16 hours at −20° C. and then conditioned for 2 hours at 23° C. with 50% r.h.

Lap shear strength of heat cured samples and of humidity cured samples which were further exposed to cataplasma conditions were measured and the results are also summarized in Table 2.

Humidity cured samples (7 d at room temperature (RT)) of Comparative Example 2 show e-coat substrate delamination. This issue can be addressed by encapsulating DDA in a polymer matrix (Inventive Example 1, Inventive Example 2 and Comparative Example 1). All Inventive Example 1, Inventive Example 2, and Comparative Example 1 showed 100% cohesive failure (cf). In Comparative Example 1 and Comparative Example 2, the lap shear strength of humidity cured samples are reduced when exposing to cataplasma conditions to 54% of the initial values. When DDA is matrix encapsulated in Intelimer IPA 13-6 as in Inventive Example 1, the lap shear strengths are not compromised when exposing the samples to cataplasma conditions. When DDA is matrix encapsulated in Affinity GA 1950 as in Inventive Example 2, the lap shear strength values are slightly lower than when DDA is nonencapsulated or encapsulated in carnauba wax. However, the lap shear strengths are not compromised when exposing the samples to cataplasma conditions.

TABLE 2

Composition, mechanical and physical data of inventive and comparative examples.

|  | Inventive Example 1 | Inventive Example 2 | Comparative Example 1 | Comparative Example 2 |
|---|---|---|---|---|
| BETASEAL ™ L1 | 95.4 | 95.4 | 95.4 | 98.4 |
| Encapsulation 1A - Intelimer IPA 13-6 | 4.6 | | | |
| Encapsulation 1B - GA 1950 (LDPE) | | 4.6 | | |
| Encapsulation 2 - Carnuba Wax | | | 4.6 | |
| 1,12-Dodecandiamine | | | | 1.6 |
| DSC Onset Temp, C. | 67 | 68 | 64 | 69 |
| Initial Viscosity (Pa · s) | 416 | 650 | 442 | 188 |
| Viscosity after 1 month (Pa · s) | 325 | 620 | 720 | 215 |
| Viscosity after 3 months (Pa · s) | 389 | 1397 | 1235 | 114 |
| *Humidity Cured, 7 d RT* | | | | |
| Lap Shear Strength, MPa | 6.5 | 3.8 | 6.1 | 5.0 |
| Elong. at Break, mm | 12.5 | 9.4 | 9.6 | 11.0 |
| Failure Mode | 100% cf | 100% cf | 100% cf | 95% cf, 5% h |
| *Humidity Cured, 7 d RT & Cata* | | | | |
| Lap Shear Strength, MPa | 6.5 | 4.0 | 3.3 | 2.7 |
| Elong. at Break, mm | 12.2 | 8.8 | 13.4 | 14.4 |
| Failure Mode | 100% cf | 100% cf | 100% cf | 97% cf, 3% h |
| *Heat Cured, 120 C./15 min., Cond. 2 hrs RT* | | | | |
| Lap Shear Strength, MPa | 4.7 | 5.6 | 3.6 | 6.2 |
| Elong. at Break, mm | 6.9 | 7.4 | 8.8 | 10.1 |
| Failure Mode | 100% cf | 100% cf | 100% cf | 100% cf |
| *Heat Cured, 120 C./15 min., Cond. 7 d RT* | | | | |
| Lap Shear Strength, % | 6.9 | 5.3 | 6.3 | 6.2 |
| Elong. at Break, mm | 9.0 | 7.9 | 9.9 | 9.6 |
| Failure Mode | 100% cf | 100% cf | 100% cf | 100% cf |
| *Heat Cured, 120 C./15 min., Cond. 7 d RT & Cata* | | | | |
| Lap Shear Strength, MPa | 6.7 | 5.1 | 6.8 | 4.5 |
| Elong. at Break, mm | 8.2 | 7.1 | 7.6 | 8.4 |
| Failure Mode | 100% cf | 100% cf | 100% cf | 100% cf |

All heat cured samples (Lap shear strength of heat cured samples of the inventive and comparative samples after being conditioned for two hours, 7 d RT, and 7 d RT and Cataplasma, respectively) showed 100% cohesive failure even when exposed to cataplasma conditions. Inventive Example 1, Inventive Example 2, Comparative Example 1, and Comparative Example 2 reached, after being exposed to 120° C. for 15 minutes and conditioned at room temperature for two hours, lap shear strengths of 4.7, 5.6, 3.6, and 6.2 MPa, respectively. After being further conditioned for seven days at room temperature, the maximum possible lap shear strength values are achieved. The matrix encapsulated amine compositions (Inventive Example 1, Inventive Example 2, and Comparative Example 1) showed a clear advantage over the nonencapsulated amine composition (Comparative Example 2) since the lap shear strength of the heat cured Comparative Example 2, after 7 d RT and cataplasma conditioning, is drastically reduced.

In summary, it appears that all Inventive and Comparative Examples can be heat activated when heated above 64° C. to cause polymerization. When inventive and comparative examples are exposed to 120° C. for 15 minutes a minimum of 50% of the maximum possible lap shear strengths are obtained. When the heat cured samples are further conditioned for 7 d at room temperature and/or 7 d at room temperature the maximum possible lap shear strengths are obtained. The matrix encapsulated compositions remained at their lap shear strength values when further exposed to cataplasma conditioning, whereas the lap shear strength values of the non encapsulated composition are drastically reduced. The inventive and comparative examples can also be cured by humidity and they reach maximum possible lap shear strengths after seven days at room temperature. When the Comparative Examples 1 and 2 are exposed to cataplasma conditions after being humidity cured, the lap shear strengths are reduced to 54% of the initial values. This is not the case in the Inventive Examples with the amine being encapsulated in Intelimer IPA 13-6, or Affinity GA 1950, 100% of the initial lap shear strength is maintained.

It is further shown that the storage stability of Inventive Example 1 is better than the Comparative Example 1. These experiments demonstrate the superior character of inventive examples as a dual cure 1K PU adhesive.

The invention claimed is:

1. An adhesive composition comprising an encapsulated hardener wherein the hardener is encapsulated by a matrix thermoplastic polymer and the hardener is an amine compound selected from 4,4'-diaminodiphenylmethane, 2, 4'-diaminodiphenylmethane, 3,3'-diaminodiphenylmethane, 3,4'-diaminodiphenylmethane, 2,2'-diaminobiphenyl, 2,4'-diaminobiphenyl, 3,3'-diaminophenyl, 2,4'-diaminophenol, 2,5-diaminophenol, o-phenylenediamine, m-phenylenediamine, 2,3-tolylenediamine, 2,4-dolyenediamine, 2,5-tolylenediamine, 2,6-tolylenediamine, 3,4-tolyenediamine, 1,12-dodecanediamine, 1,14-tetradecanediaimine, 1,16-hexadecanediamine, 1,18-octadecandediamine, and 1,20-eicosanediamine, wherein the thermoplastic polymer comprises an alkyl C10-30 brushed acrylic polymer or a 1-octene ethylene copolymer.

2. The composition according to claim 1, wherein the thermoplastic polymer comprises an alkyl C10-30 brushed acrylic polymer.

3. The composition according to claim 1, wherein the thermoplastic polymer comprises a 1-octene ethylene copolymer.

4. The composition according to claim 1, wherein the amine compound comprises 1,12-dodecanediamine.

* * * * *